(12) United States Patent
Nagasawa et al.

(10) Patent No.: US 9,469,267 B2
(45) Date of Patent: Oct. 18, 2016

(54) AIRBAG DEVICE

(71) Applicant: Fuji Jukogyo Kabushiki Kaisha, Tokyo (JP)

(72) Inventors: Isamu Nagasawa, Tokyo (JP); Masaaki Kobayashi, Tokyo (JP); Kousuke Yamada, Tokyo (JP); Junichi Oorai, Tokyo (JP); Takeru Shoji, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/660,757

(22) Filed: Mar. 17, 2015

(65) Prior Publication Data

US 2015/0274113 A1    Oct. 1, 2015

(30) Foreign Application Priority Data

Mar. 28, 2014  (JP) .................................. 2014-069668

(51) Int. Cl.
*B60R 21/231*    (2011.01)
*B60R 21/207*    (2006.01)

(52) U.S. Cl.
CPC ........... *B60R 21/231* (2013.01); *B60R 21/207* (2013.01); *B60R 2021/2074* (2013.01); *B60R 2021/23146* (2013.01); *B60R 2021/23161* (2013.01)

(58) Field of Classification Search
CPC .............. B60R 21/231; B60R 21/207; B60R 2021/23161; B60R 2021/2074; B60R 2021/23146
See application file for complete search history.

(56) References Cited

U.S. PATENT DOCUMENTS

| | | | | |
|---|---|---|---|---|
| 3,779,577 | A  * | 12/1973 | Wilfert ................. | B60R 21/207 280/730.1 |
| 7,484,753 | B2 * | 2/2009 | Sugimoto ............. | B60R 21/207 280/730.1 |
| 7,641,224 | B2 * | 1/2010 | Riedel .................. | B60R 21/233 280/728.1 |
| 8,210,566 | B2 * | 7/2012 | Fukawatase ......... | B60R 21/231 280/728.3 |
| 8,353,529 | B2 * | 1/2013 | Tomitaka ............. | B60R 21/231 280/730.1 |
| 2015/0084315 | A1* | 3/2015 | Acker ............... | B60R 21/23138 280/728.2 |
| 2015/0158453 | A1* | 6/2015 | Fujiwara ............. | B60R 21/207 280/730.2 |

FOREIGN PATENT DOCUMENTS

| | | |
|---|---|---|
| JP | 2009-280023 A | 12/2009 |
| JP | 2010-115947 A | 5/2010 |
| JP | 2011-116153 A | 6/2011 |

OTHER PUBLICATIONS

Chinese Office Action dated Aug. 15, 2016 with an English translation thereof.

* cited by examiner

*Primary Examiner* — Darlene Condra
(74) *Attorney, Agent, or Firm* — McGinn IP Law Group, PLLC

(57) ABSTRACT

An airbag device has an airbag housing that is provided in inward lateral faces of a driver's seat backrest and a passenger seat backrest in a vehicle width direction. An upper portion of the airbag housing is provided with a cover portion through which the airbag supplied with gas moves upward from the airbag housing.

9 Claims, 6 Drawing Sheets

AIRBAG DEVICE

CROSS-REFERENCE TO RELATED APPLICATIONS

The present application claims priority from Japanese Patent Application No. 2014-069668 filed on Mar. 28, 2014, the entire contents of which are hereby incorporated by reference.

BACKGROUND

1. Technical Field

The present disclosure relates to an airbag device for protecting the upper half body of an occupant such as a driver and a passenger in a vehicle against an impact due to a side collision, the vehicle having seats disposed apart from each other in a vehicle width direction.

2. Related Art

A method has been widely used in which an airbag device provided in a vehicle is activated to reduce an impact to an occupant when a collision of the vehicle occurs. A conventional airbag device is disposed in a steering wheel provided forward of the driver's seat or in an instrument panel provided forward of a passenger seat so that forward movement of an occupant facing the airbag device is restrained. Thus, an impact to the occupant at the time of a head-on collision of a vehicle is reduced and the occupant may be protected from the head-on collision.

In recent years, a device has been developed that protects an occupant using an airbag device even at the time of a side collision of a vehicle. For example, what is called a side airbag device inflates between the side (door) of a vehicle body and the occupant to protect the occupant. Thus, the occupant is protected against a direct impact in a side collision of a vehicle as well as prevented from colliding with the side of the vehicle.

Such a conventional side airbag device is unable to restrain inward movement of the occupant in a vehicle width direction. For this reason, when a side collision of a vehicle occurs, the upper half body of the occupant may be moved in the lateral direction to collide with another occupant on the next seat or the neck of the occupant may be suddenly moved in the lateral direction and damaged. In order to address such problems, an airbag device described in Japanese Unexamined Patent Application Publication (JP-A) No. 2010-115947 allows an airbag to expand upward, the airbag being housed in a center console provided between the driver's seat and a passenger seat. Thus, the airbag expands between the driver's seat and a passenger seat, thereby making it possible to prevent collision between a driver on the driver's seat and a passenger on the passenger seat.

In the airbag device described in JP-A No. 2010-115947, the airbag housed in the center console expands upward. For this reason, in the case where the airbag deploys with small articles and/or drink placed on the center console, those small articles on the center console are bounded up when the air bag deploys, thereby causing danger. Consequently, small articles and/or drink cannot be placed on the center console, and thus the center console may not be effectively used in normal conditions.

Also, because there is a certain vertical distance from the center console housing the airbag to the head of an occupant, inflation and expansion of the airbag may not work before the start of movement of the head and the upper half body of the occupant due to a collision of the vehicle.

SUMMARY OF THE DISCLOSURE

The present disclosure has been designed in consideration of the circumstances described above, and an object thereof is to provide an airbag device that allows effective use of the space between seats in normal conditions and is capable of efficiently restraining the movement of especially the head and the upper half body of an occupant in a vehicle width direction due to a side collision of a vehicle.

An aspect of the present disclosure provides an airbag device used in a vehicle having seats disposed apart from each other in a vehicle width direction, the airbag device including an airbag that inflates and deploys from an inner side of a backrest of a corresponding one of the seats in the vehicle width direction. The airbag inflates and deploys upward, then inflates and deploys at least in a forward direction of the vehicle.

DETAILED DESCRIPTION

FIGS. 1 to 6 illustrate an implementation of the present disclosure.

Figure 1:
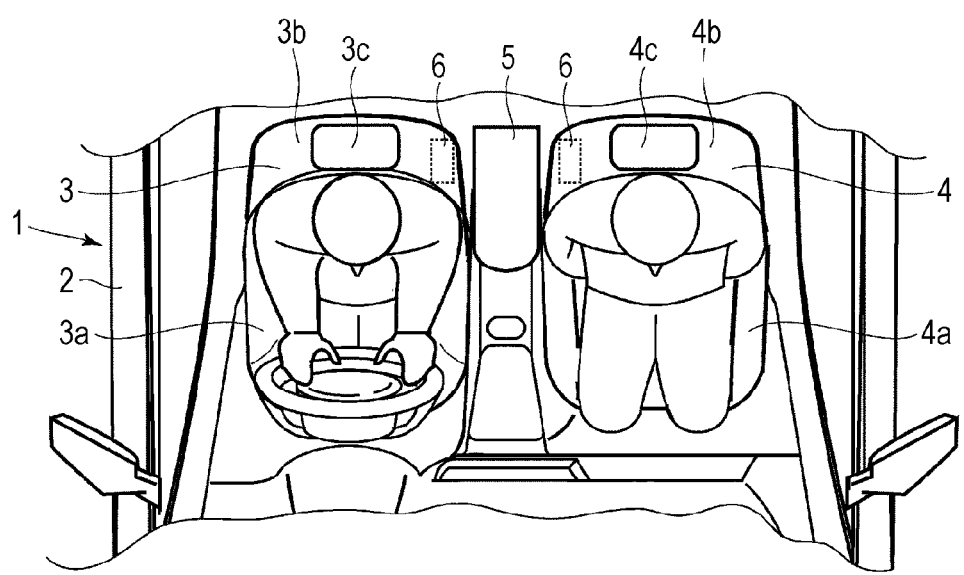
FIG. 1 is a schematic plan view of the front part of a vehicle cabin in normal conditions of a vehicle equipped with an airbag device of an implementation.

As illustrated in FIG. 1, in a vehicle 1 equipped with an airbag device in the present disclosure, a driver's seat 3 and a passenger seat 4 are disposed in a vehicle width direction and provided independently to each other in the front part of the cabin of a vehicle body 2. In addition, the driver's seat 3 and the passenger seat 4 are disposed apart from each other, and a center console 5 is provided between the driver's seat 3 and the passenger seat 4.

The driver's seat 3 has a driver's seat seating surface 3a on which the driver sits, a driver's seat backrest 3b that extends upward from the rear of the driver's seat seating surface 3a and supports the back of the driver, and a headrest 3c that is provided in an upper portion of the driver's seat backrest 3b and supports the head of the driver. The driver's seat seating surface 3a is freely movable along a seat rail (not illustrated) that is provided on the floor of the vehicle cabin and extends in the fore-and-aft direction of the vehicle, and thus the position of the driver's seat seating surface 3a in the fore-and-aft direction with respect to the vehicle body may be changed. The driver's seat backrest 3b is freely rotatable about the shaft at a lower portion in the fore-and-aft direction of the vehicle, and the backrest angle is adjustable. The passenger seat 4 also has a passenger seat seating surface 4a, a passenger seat backrest 4b, and a headrest 4c, and so the passenger seat 4 has a similar configuration to that of the driver's seat 3. The center console 5 is provided in the fore-and-aft direction of the vehicle and includes a storage box for storing small articles and a drink holder for holding a drink container.

Figure 2A:
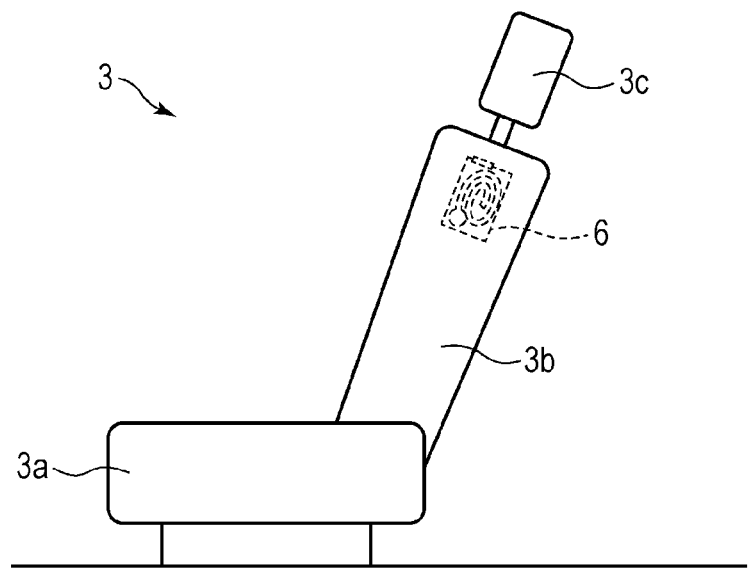
FIG. 2A is a right side view of the driver's seat of a vehicle equipped with the airbag device in the implementation.
Figure 2B:
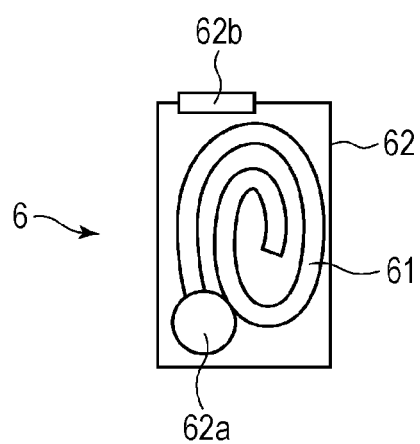
FIG. 2B is a schematic side view of the airbag device.

An airbag device 6 is provided beneath each of an upper portion of the inward lateral face (the lateral face facing the passenger seat 4) of the driver's seat backrest 3b in the vehicle width direction and an upper portion of the inward lateral face (the lateral face facing the driver's seat 3) of the passenger seat backrest 4b in the vehicle width direction. As illustrated in FIG. 2B, the airbag device 6 includes an airbag 61 that is inflatable and deployable at the time of collision of the vehicle 1, and an airbag housing 62 in which the airbag 61 is housed in a folded state.

The airbag 61 is in a shape that is inflatable and deployable in the vehicle width direction and is vertically and forwardly extendable in a long range. In addition, a tether (not illustrated) attached to the inner surface of the airbag 61 allows the upper edge of the inflated and deployed airbag 61 to be in a cylindrical shape extending in the fore-and-aft direction of the vehicle, thereby reinforcing the stiffness of the airbag 61 in the fore-and-aft direction of the vehicle. Also, inflation of each airbag 61 in the vehicle width direction is possible at least until the airbags 61, which have inflated and deployed from the backrests of adjacent seats, come into contact with each other.

The airbag housing 62 is provided with an inflator 62a that is connected with the airbag 61. A gas discharged from the inflator 62a is supplied into the airbag 61. In addition, an upper portion of the airbag housing 62 is provided with a cover 62b through which the airbag 61 supplied with gas moves upward from the airbag housing 62. Thus, when gas is supplied into the airbag 61 from the inflator 62a, the airbag 61 moves upward from the cover 62b and starts to inflate and deploy.

Figure 3:
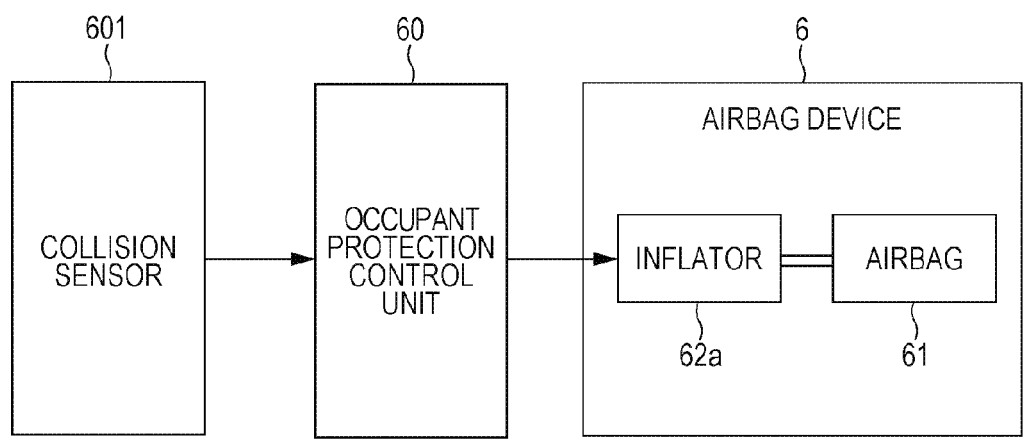
FIG. 3 is a block diagram illustrating input and output of a control signal according to the airbag device of the implementation.

As illustrated in FIG. 3, the airbag device 6 is controlled by an occupant protection control unit 60. The occupant protection control unit 60 is, for example, a CPU or an ECU, and has an input side connected to a collision sensor 601 and an output side connected to the inflator 62a. In the case where the collision sensor 601 detects a collision of the vehicle 1, a detection signal is outputted from the collision sensor 601 to the occupant protection control unit 60. Upon receiving an input of the detection signal, the occupant protection control unit 60 outputs a control signal to the inflator 62a, the control signal for starting supply of gas to the airbag 61, and thus supply of gas from the inflator 62a to the airbag 61 is started. It is to be noted that a collision prediction device for predicting a collision of the vehicle 1 based on the conditions of the vehicle 1 and/or outside the vehicle 1 may be connected to the input side of the occupant protection control unit 60, and when a collision of the vehicle 1 is predicted, a control signal may be outputted to the inflator 62a, the control signal for starting supply of gas to the airbag 61.

The operation of the airbag device 6, at the time of side collision, of the vehicle 1 configured as above will be described.

Figure 4:
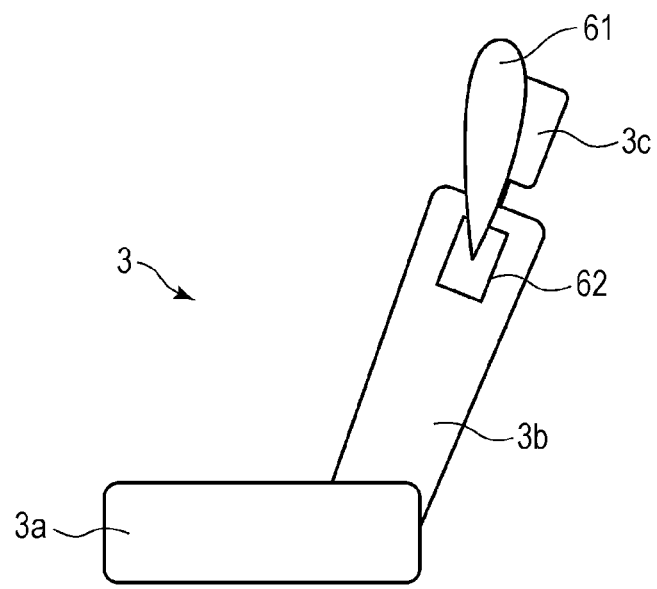
FIG. 4 is a schematic right side view of the driver's seat when the airbag of the airbag device of the implementation starts to deploy.

When the collision sensor 601 detects a collision of the vehicle 1, a control signal for supplying gas to the airbag 61 is outputted from the occupant protection control unit 60 to the inflator 62a. The inflator 62a, which has received an input of the control signal, supplies gas into the airbag 61, then the airbag 61 starts to inflate and deploy. As illustrated in FIG. 4, the airbag 61 moves upward through each of the cover 62b of the airbag housing 62 in a lateral face of the driver's seat backrest 3b, the lateral face facing the passenger seat and the cover 62b of the airbag housing 62 in a lateral face of the passenger seat backrest 4b, the lateral face facing the driver's seat, then the airbag 61 inflates and deploys upward.

Figure 5:
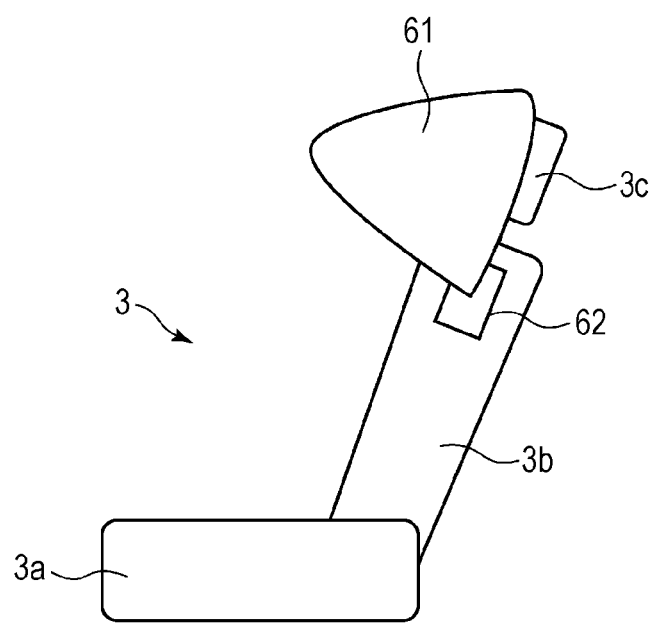
FIG. 5 is a schematic right side view of the driver's seat when the airbag of the airbag device of the implementation deploys.

After the airbag 61 inflates and deploys upward, the airbag 61 inflates and deploys in the forward direction of the vehicle as illustrated in FIG. 5. That is, the airbag 61 inflates upward first due to upward moving force, and when the upward inflation is completed, the airbag 61 deploys in the forward direction. In this manner, the inflated and deployed airbag 61 forwardly covers an upper space inwardly of the driver's seat 3 in the vehicle width direction.

Figure 6:
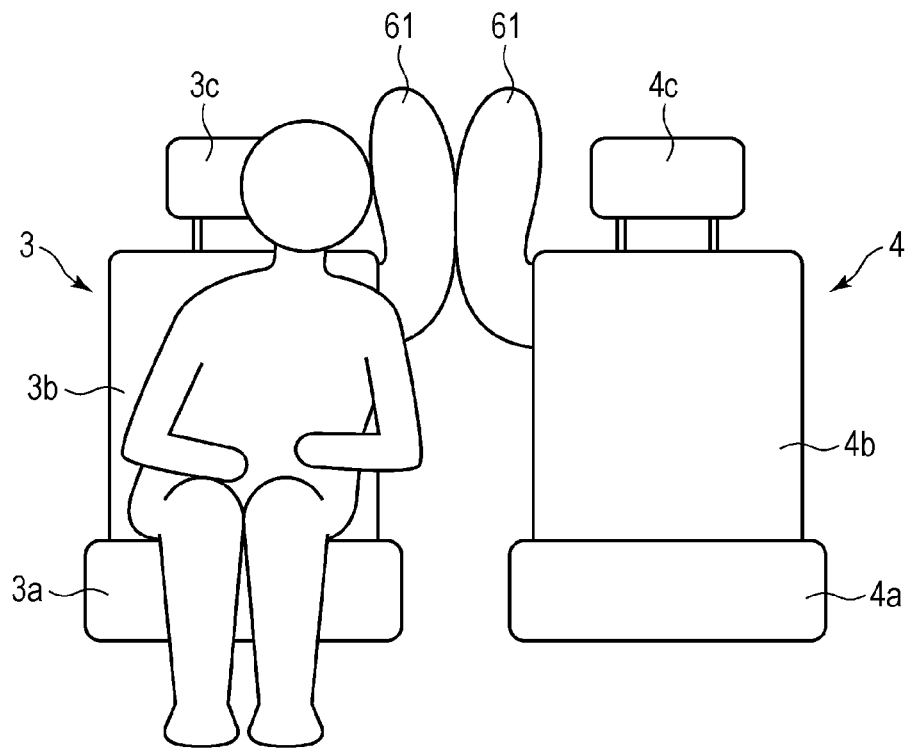
FIG. 6 is a schematic front view of the driver's seat and a passenger seat when the airbag of the airbag device of the implementation deploys.

In this manner, the airbag 61 deploys upward, then deploys forward, thereby making it possible to expand over the entire vicinity of an upper portion inwardly of the seat in the vehicle width direction. The airbag 61 covers the upper portion inwardly of the driver's seat 3 in the vehicle width direction, thereby restraining inward movement of the upper half body and the head of a driver in the vehicle width direction as illustrated in FIG. 6, the driver seating on the driver's seat 3. Consequently, the upper half body of the occupant, especially the head may be properly protected against an impact due to a side collision of the vehicle 1.

When gas supply is started, the airbag 61 inflates and deploys upward first. For this reason, the head of the occupant, which should be protected with high priority, may be protected first. That is, for example, even if movement of the abdomen and/or the chest of the occupant in the vehicle width direction is restrained, the head and neck may not be protected against an impact if movement of the head in the vehicle width direction is not restrained. However, since the airbag 61 inflates and deploys upward first, protection of the head of the occupant may be made quickly.

In addition, the airbag device 6 is provided in an upper portion of the driver's seat backrest 3b, and thus movement of the upper half body of a driver in the vehicle width direction may be restrained more quickly. To the contrary, in the case where the airbag device 6 is provided in the roof, the floor, or the center console of the vehicle 1, it takes time for the inflated and deployed airbag 61 to reach the vicinity of the head of a driver since the start of gas supply from the inflator 62a. For this reason, before the airbag 61 completely inflates and deploys, the upper half body of a driver may be moved in the vehicle width direction. However, the airbag device 6 is provided in the upper portion of driver's seat backrest 3b, which is nearer to the head of a driver. Therefore, the time from the start of inflation and expansion of the airbag 61 to a state in which inward movement of the head and the upper half body of the occupant in the vehicle width direction is restrainable may be reduced compared with the case where the airbag device 6 is provided in, for example, the roof of the vehicle 1. For this reason, in the case of a side collision of the vehicle 1, the airbag 61 quickly inflates and deploys to the vicinity of the head and the upper half body of the occupant, thereby making it possible to restrain the movement of the head and the upper half body in the vehicle width direction.

Furthermore, the airbag device 6 is provided in each of the driver's seat backrest 3b and the passenger seat backrest 4b, the airbag 61 may be reduced in size compared with the case where one airbag is provided in the roof or the center console 5 of the vehicle 1. Thus, it is possible for the air bag device 6 to be provided even in the case where the vehicle is such that the driver's seat 3 and the passenger seat 4 are small in size or the space between the driver's seat 3 and the passenger seat 4 is narrow.

In the present implementation, an airbag 61 inflates and deploys from each of the inner sides of the driver's seat backrest 3b and the passenger seat backrest 4b in the vehicle width direction. Alternatively, an auxiliary airbag for supporting the airbag 61 may be provided. The auxiliary airbag is inflatable and deployable substantially at the same time as the airbag 61, and inflates and deploys at a position more inward than the airbag 61 in the vehicle width direction. The auxiliary airbag has a higher stiffness than that of the airbag 61 because of its frame and tether, and is able to support the airbag 61 from the inner side in the vehicle width direction and to reinforce the reaction force of the airbag 61. It is desirable that the auxiliary airbag be inflatable and deployable in the fore-and-aft direction in a longer range than the airbag 61.

In the present implementation, the airbag device 6 is provided in the inward lateral face of the driver's seat backrest 3b in the vehicle width direction and the inward lateral face of the passenger seat backrest 4b in the vehicle width direction. Alternatively, the airbag device 6 may be provided, for example, in an upper portion inwardly of the driver's seat backrest 3b and the passenger seat backrest 4b in the vehicle width direction, or in the vicinity inwardly of the headrest 3c and the headrest 4c in the vehicle width direction. The airbag 61 in the present implementation inflates and deploys between the driver's seat 3 and the passenger seat 4. Alternatively, the airbag 61 may be used also in a vehicle that is provided with three or more seats such as rear seats disposed in the vehicle width direction.

Figure 7:
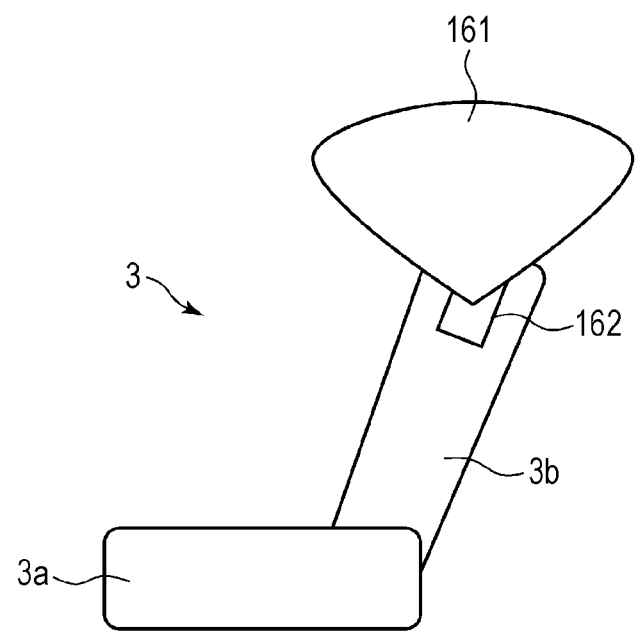
FIG. 7 is a schematic right side view of the driver's seat when the airbag of the airbag device of a modification deploys.

Next, an airbag 161 will be described as a modification of the airbag 61 in the above implementation with reference to FIG. 7. A description of repeated or the same components as those in the above-described implementation will be omitted.

The airbag 161 is housed in an airbag housing 162, and when gas is supplied from an inflator, the airbag 161 inflates and deploys inwardly in the vehicle width direction, and is in a long-extending shape that is inflatable and deployable in the upward and fore-and-aft direction of the vehicle. That is, the airbag 161, when starting to inflate and deploy, extends upward due to upward moving force, and subsequently extends and expands in the forward and rearward directions of the vehicle simultaneously. Thus, the inflated and deployed airbag 161 is in a shape extending upward from the airbag housing 162 and extending in the forward and rearward directions of the vehicle as illustrated in FIG. 7.

In this manner, the inflated and deployed the airbag 161 is in a long-extending shape in the fore-and-aft direction of the vehicle, and thus the airbag 161 that has inflated and deployed from the driver's seat backrest 3b and the airbag 161 that has inflated and deployed from the passenger seat backrest 4b reliably come into contact with each other. That is, even in the case where the positions of the driver's seat 3 and the passenger seat 4 in the fore-and-aft direction of the vehicle are not aligned, for example, in the case where the passenger seat 4 is moved rearward of the driver's seat 3, the inward surfaces of the airbags 161 in the vehicle width direction come into contact with each other because the both airbags 161 have extended in the fore-and-aft direction. For this reason, the airbag 161 that has inflated and deployed from the driver's seat backrest 3b and the airbag 161 that has inflated and deployed from the passenger seat backrest 4b urge against each other.

Figure 8A:
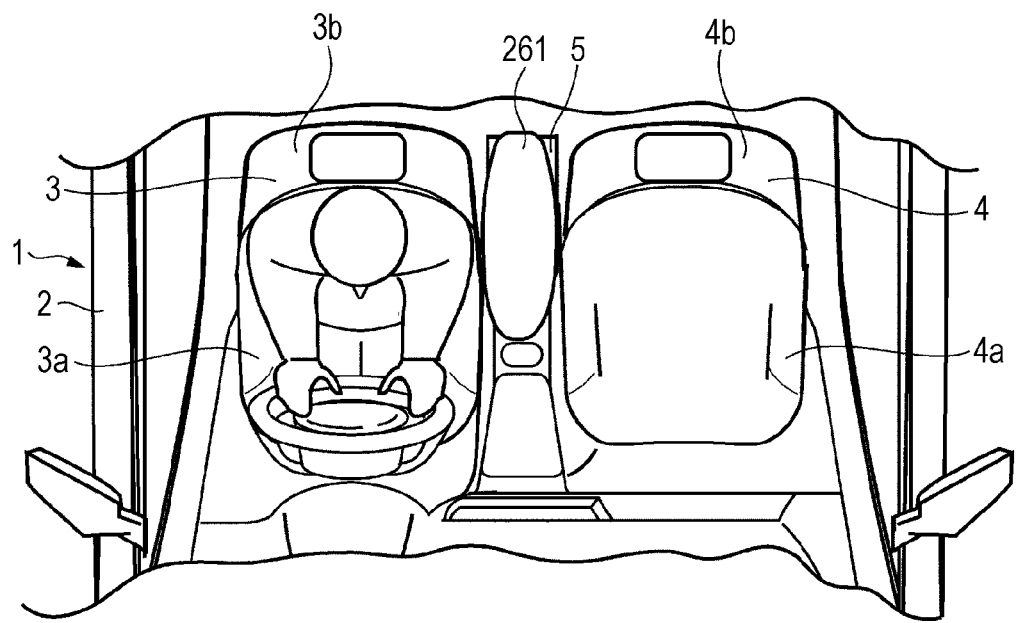
FIGS. 8A and 8B are each a schematic plan view of the front part of the vehicle cabin when an airbag of another implementation deploys.
Figure 8B:
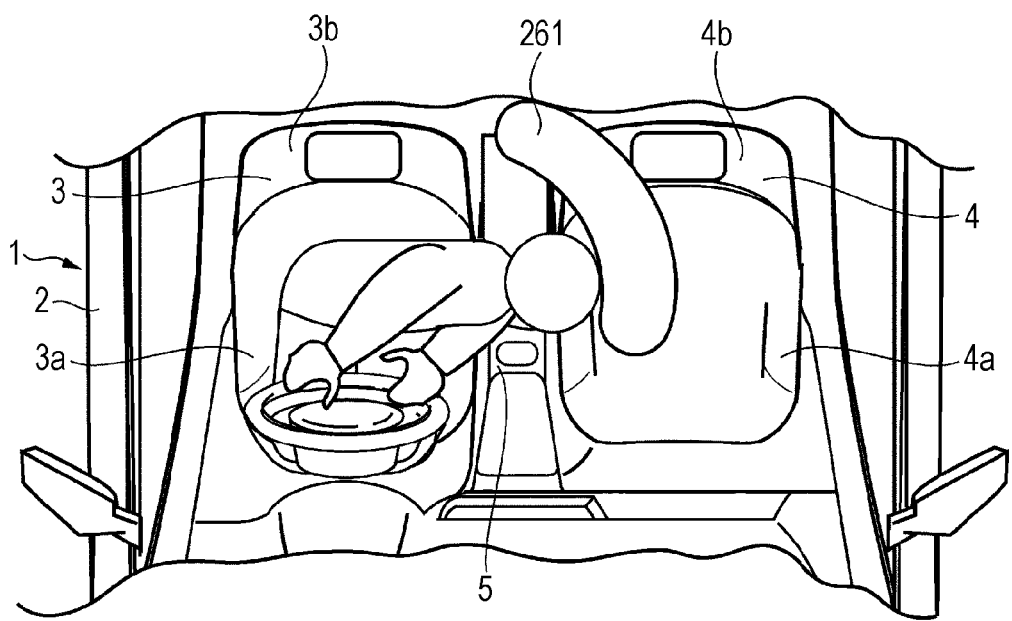

The airbags 161, which have inflated and deployed from the respective lateral faces of a plurality of seats (the driver's seat 3 and the passenger seat 4 in the present implementation) disposed in the vehicle width direction, come into contact with and urge against each other, and thus the airbags 161 are able to mutually support a force applied in the vehicle width direction. For example, suppose a case where the airbag 261 inflates and deploys downward from the ceiling of the vehicle body 2 between the driver's seat 3 and the passenger seat 4 as illustrated in FIG. 8A so that movement of a driver on the driver's seat toward the passenger seat 4 is restrained. In this case, the airbag 261 may not have a sufficient reaction force against movement of a driver on the driver's seat toward the passenger seat 4, and thus the driver on the driver's seat may be moved toward the passenger seat 4 as illustrated in FIG. 8B. That is, no element is provided to support the airbag 261 in the vehicle width direction, and therefore the airbag 261 does not have a sufficient reaction force against the movement of the driver on the driver's seat toward the passenger seat 4.

However, when the airbags 161 inflate and deploy, the airbags being respectively provided in the driver's seat 3 and the passenger seat 4 disposed in the vehicle width direction, the inward portions of the airbags 161 in the vehicle width direction come into contact with and support each other. In this manner, the airbags 161 disposed in the vehicle width direction support each other to reinforce the reaction force, and thus movement of the driver on the driver's seat toward the passenger seat 4 and movement of a passenger on the passenger seat toward the driver's seat 3 may be efficiently restrained. It is to be noted that each airbag 161 may have substantially the same length of the front side and the rear side in the fore-and-aft direction of the vehicle, or may have different lengths of the front side and the rear side in the fore-and-aft direction of the vehicle, for example, the front side of the airbag 161 in the fore-and-aft direction of the vehicle may be longer and in an inflatable and deployable shape.

The invention claimed is:

1. An airbag device used in a vehicle having seats disposed apart from each other in a vehicle width direction, the airbag device comprising
an airbag that inflates and deploys from an inner side of a backrest of a corresponding one of the seats in the vehicle width direction,
wherein the airbag inflates and deploys in an upward direction, then inflates and deploys at least in a forward direction and a rearward direction of the vehicle simultaneously.

2. The airbag device according to claim 1, wherein the airbag inflates and deploys in the upward direction to a position higher than a height of the backrest.

3. The airbag device according to claim 2, wherein the airbag inflates and deploys from an upper portion of the inner side of the backrest in the vehicle width direction.

4. The airbag device according to claim 1, wherein the airbag inflates and deploys from an upper portion of the inner side of the backrest in the vehicle width direction.

5. The airbag device according to claim 1, wherein a bottom of the inflated and deployed airbag is above a bottom of the inner side of the backrest.

6. The airbag device according to claim 1, wherein the inflated and deployed airbag forms a V-shape with an apex of the V-shape pointing in the upward direction.

7. The airbag device according to claim 1, wherein the inflated and deployed airbag is entirely disposed above a mid-point of the backrest of the seat in the upward direction.

8. The airbag device according to claim 1, wherein the airbag sequentially inflates and deploys in the upward direction, and then the forward direction and the rearward direction simultaneously such that the inflated and deployed airbag is completely inflated in the upward direction, forward direction, and the rearward direction.

9. The airbag device according to claim 1, further comprising a second airbag that inflates and deploys from an inner side of a backrest of a corresponding second seat of the seats in the vehicle width direction, chamber,
    wherein the second airbag inflates and deploys in an upward direction, then inflates and deploys at least in a forward direction and a rearward direction of the vehicle simultaneously, and
    wherein a portion of the airbag inflated and deployed in the forward direction contacts a portion of the second airbag inflated and deployed in the rearward direction.

\* \* \* \* \*